Feb. 15, 1944.   G. PIEROTTI ET AL   2,341,812
EXTRACTIVE DISTILLATION
Filed July 21, 1941
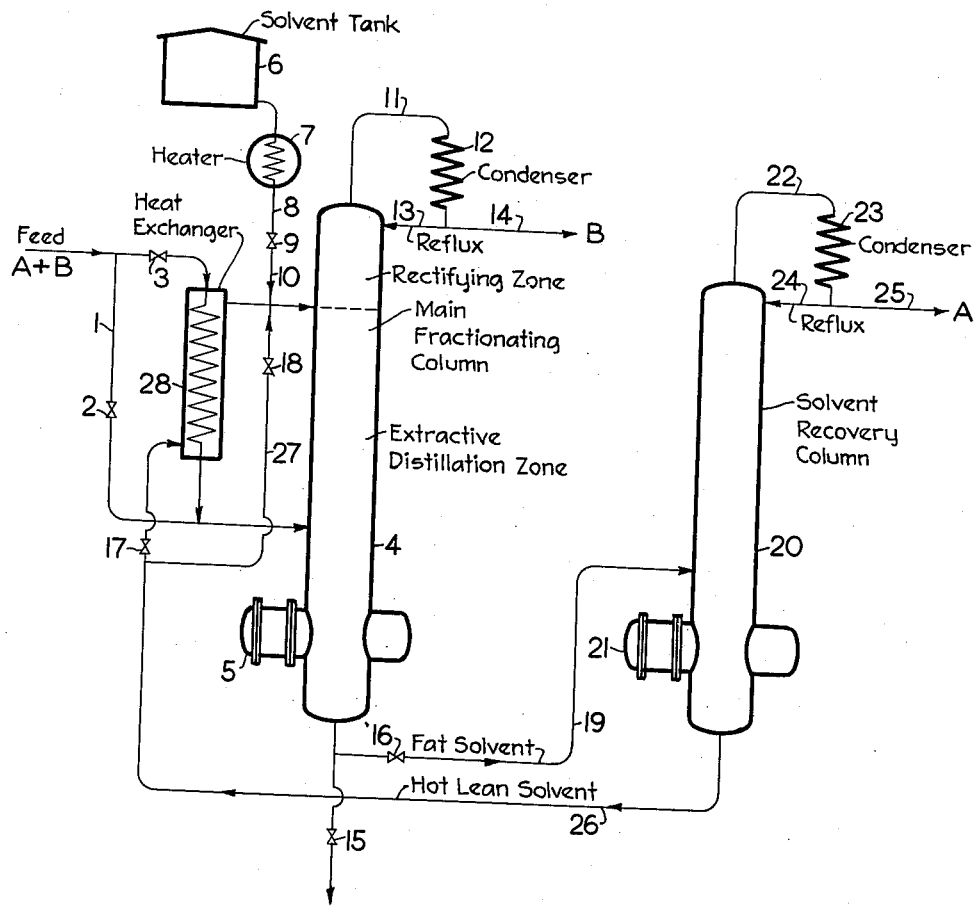
Inventors: Gino Pierotti
Clarence L. Dunn
By their Attorney:

Patented Feb. 15, 1944

2,341,812

UNITED STATES PATENT OFFICE 2,341,812

EXTRACTIVE DISTILLATION

Gino Pierotti and Clarence L. Dunn, Berkeley, Calif., assignors to Shell Development Company, San Francisco, Calif., a corporation of Delaware Application July 21, 1941, Serial No. 403,380

5 Claims. (Cl. 202—40)

The present invention relates to improvements in separation processes, and more particularly pertains to improvements in extractive distillation. The extractive distillation process is useful for obtaining separations between different components of mixtures which have such similar vapor pressures as to make their fractionation difficult, if not impossible, by ordinary distillation, or to separate components which form azeotropes. It is carried out either continuously or in batch by flowing a relatively high boiling solvent, which is selective for one of the components in the feed, down a distillation column as the distillation proceeds. In this manner, the relatively less soluble component passes overhead while the selective solvent scrubs the soluble component from the vapor.

The resulting fat solvent containing the dissolved components is withdrawn from the bottom of the column and the dissolved component and solvent may be separated in an auxiliary apparatus. The recovered solvent may be returned to the main column for use in another cycle. In extractive distillation columns it is customary to introduce the solvent to the column at some point below the top in order that the plates above the solvent port may function to prevent loss of solvent overhead. In the subsequent discussion we shall term this portion of the extractive distillation system the "rectifying zone," as opposed to that portion of the system below the solvent feed port, which we will call the "extractive distillation zone." It is evident that the rectifying zone may be a separate structural unit.

In the past it has been customary to introduce the solvent to the extractive distillation column at a temperature equal to the normal equilibrium temperature of the column at that point. However, we have found that there are certain advantages in introducing at least a part of the solvent to the column at a temperature higher than the normal equilibrium temperature at that point.

It is an object of our invention to provide an improved process for extractive distillation. It is another object to provide a process which enables increased throughput of extractive distillation columns. It is yet another object to provide a process wherein the solvent rate in a given column can be reduced with corresponding savings in heat. Further objects will be apparent from the following specification.

For any given extractive distillation system there are fundamentally two separations to be considered, that is: (1) the separation of the components in the feed, and (2) the separation of the solvent from that component which is not selectively dissolved (that is, the overhead). The difficulty of this latter separation which takes place in the rectifying zone is a function of the relative volatility of the overhead with respect to the solvent. Depending on the relative volatility, it is sometimes necessary to employ an excessively large number of plates in the rectifying zone, or alternatively, to increase the reflux ratio in this zone of the column in order to prevent loss of valuable solvent in the overhead. Indeed, in some cases, the reflux in the extractive distillation zone is below the minimum reflux of the rectifying zone, and thus a higher reflux is required in the rectifying zone than in the extractive zone, irrespective of the number of plates in the rectifying zone. An increase in reflux in the rectifying zone can of course be brought about by increasing the reflux in the whole column; however, doing so will increase the vapor and liquid load in the extractive zone. Any increase in the liquid load in the extractive zone must be accompanied by an increase in solvent feed in order to maintain a given concentration of solvent on the plates, which is necessary to maintain a given degree of separation of the components in the feed. Our process enables us to carry out a satisfactory separation between overhead and solvent by employing a higher reflux ratio in the rectifying zone of the column without disturbing the reflux ratio in that portion of the column below the solvent feed port, which is principally concerned with separation of the components of the feed.

The application of our process to a given extractive distillation may be illustrated by the case wherein it is desired to produce toluene of high purity from a concentrate containing toluene and other non-toluene hydrocarbons such as are produced from petroleum, as described in copending application, Serial No. 348,046, filed July 27, 1940, now U. S. Patent No. 2,288,126. For this separation, let us assume a system similar to that of the drawing hereinafter described is used. We will assume that phenol is to be used as a selective solvent for the toluene which is to be withdrawn from the bottom of the column, while the non-toluene hydrocarbons pass overhead. The ratio of hydrocarbon reflux down the column below the solvent feed port to hydrocarbon product overhead is 2:1. It is evident that the part of the column above the solvent feed port is concerned only with the removal of solvent from the non-toluene overhead which has a fixed composition with respect to toluene that does not change in this part of the column. Let us suppose that the column is designed to operate with 40% phenol as solvent in the column and that the non-toluene overhead is to contain not more than 1% toluene. But under these conditions it is found that an excessive loss of phenol occurs to the overhead. To apply our invention, we may proceed as follows: first, we determine the normal equilibrium temperature of the column at the point of solvent introduction. We do this by determining the boiling point of a mixture containing 40% phenol and 60% of solvent-free overhead which contains 99% non-toluene and 1% toluene. This boiling temperature is corrected for the pressure within the column. This temperature is that of the solvent feed port. We now increase the temperature of the solvent to some temperature above that of the solvent port, and at the same time increase the reflux to the upper part of the column to a degree corresponding to the additional heat introduced with the solvent. This increased reflux ratio enables the loss of phenol overhead to be reduced to the required degree.

In an actual case, by employing the above method it was possible to reduce the loss of phenol overhead from 0.1% at 2½ reflux ratio to 0.015% at 3.3 reflux ratio, in the upper portion of the column.

In the specification and claims the term "normal equilibrium temperature" is used to denote that temperature for any system which can be found in the manner illustrated, gives the overhead composition, reflux ratios, and quantity of solvent to be used.

Further to explain the invention, reference is had to the drawing, which is a schematic diagram illustrating the principles of our invention and an embodiment thereof wherein a feed containing components A and B, the former of which is preferentially soluble in a relatively high boiling selective solvent, is separated.

The feed, which has been heated to the proper temperature, is admitted via line 1 and valve 2 (valve 3 being closed) to an intermediate portion of fractionating column 4 equipped with reboiler 5. A relatively high boiling solvent for A passes from storage tank 6 through heater 7 and valve 8 in line 9 and line 10, to column 4 (valves 18 and 17 being closed). The temperature of the solvent leaving heater 7 and entering column 5 is above the normal equilibrium temperature of column 4 at the point where the solvent is introduced (line 10) as explained hereinafter. The heat admitted with the hot solvent permits a higher reflux ratio to be maintained in that portion of column 4 above line 10 without overloading the lower portion of column 4, as hereinbefore discussed. This permits a greater degree of separation and thus helps prevent loss of any solvent tending to come overhead with B through line 11. The overhead is condensed in condenser 12 and a part thereof is returned as reflux to column 4 through line 13, while B is withdrawn as product through line 14. The solvent flows down through column 4 as the distillation proceeds, selectively dissolving the more soluble component A and at the same time reducing its relative vapor pressure. Column 4 is regulated to function in such a manner that solvent containing substantially only A is withdrawn from the bottom thereof through valve 15 (valve 16 being closed).

The above description explains the principles of operation according to the present invention, although in practice operation would probably be carried out with recirculation of recovered solvent as follows (valves 3, 8, 15 and 17 being closed and valves 2 and 18 being open): In this case, the hot lean solvent withdrawn from the bottom of column 4 passes via line 19 to stripping column 20 equipped with reboiler 21, overhead line 22 and condenser 23. Dissolved component A is stripped from solvent in column 20 and passes overhead to be condensed and a portion returned as reflux through line 24, while the remainder is withdrawn as product through line 25. Hot lean solvent is withdrawn from the bottom of column 20 and recirculates to column 4 via line 26, line 27, valve 18 and line 10.

Sometimes it is desirable to use only a portion of the sensible heat available in the hot lean solvent from the column 20 in our process. Under these circumstances the rest of the heat may be employed for any desirable purpose, such as preheating the feed to column 4. When it is desired to operate in this manner, valves 17 and 18 are adjusted to cause all or a part of the hot lean solvent to recirculate back to column 4 via heat exchanger 28 and line 10. Valves 2 and 3 are adjusted to cause the whole or a part of the feed to pass through heat exchanger 28 before entering column 4. Although our invention has been illustrated with reference to a single main fractionating column, it is within the scope of the invention to use two separate columns, one corresponding to the lower portion of column 4, i. e., the extractive distillation zone, and the other corresponding to that portion of column 4 above solvent inlet 10, i. e., the rectifying zone. Under these circumstances hot solvent, for example from the stripper, is introduced at the bottom of the column corresponding to the upper portion of column 4 to supply heat for reflux.

For purposes of simplicity pumps, bypasses and other auxiliaries, the proper placement of which is obvious to anyone skilled in the art, have been omitted.

Our invention is applicable to any extractive distillation where it is desired to operate the rectifying zone of the system at a higher reflux ratio than the extractive distillation section. It is especially useful in cases where it is impracticable to add extra plates to the rectifying zone or impossible to achieve the result by adding any number of plates. Although the solvent may be heated by any external source it is usually preferable to utilize the heat in the solvent leaving the bottom of the solvent recovery column. The whole or a part of this heat may be used.

We claim as our invention:

1. In a method of extractively distilling a distillation feed comprising components A and B in the presence of a higher boiling liquid stable solvent in an extractive distillation system comprising a rectifying zone and an extractive distillation zone, A being relatively soluble in said solvent and B being relatively insoluble therein, said solvent being introduced to said system at a point intermediate to said rectifying zone and said extractive distillation zone, wherein in said latter zone vapors of said feed contact descending liquid solvent and reflux, the latter originating at the top of said rectifying zone, to produce a fat solvent rich in A and residual vapors rich in B, which latter pass to said rectifying zone, while said fat solvent is withdrawn from the lower portion of said extractive distillation zone, the improvement comprising introducing said solvent at a temperature in excess of the normal equilibrium temperature at said point of introduction and increasing said reflux to utilize excess heat content of said solvent whereby a higher reflux ratio is maintained in said rectifying zone than in said extractive distillation zone.

2. The method of claim 1 wherein said rectifying zones and said extractive distillation zones are within one column.

3. In a method of extractively distilling a distillation feed comprising components A and B in the presence of a higher boiling liquid stable solvent in an extractive distillation system comprising a rectifying zone and an extractive distillation zone, A being relatively soluble in said solvent and B relatively insoluble therein, said solvent being introduced to said system at a point intermediate to said rectifying zone and said extractive distillation zone, wherein in said latter zone vapors of said feed contact descending liquid solvent and reflux, the latter originating at the top of said rectifying zone, to produce a fat solvent rich in A and residual vapors rich in B, which latter pass to said rectifying zone while said fat solvent is withdrawn from the lower portion of said extractive distillation zone, passes to an auxiliary solvent recovery column wherein A is stripped from solvent and from which hot lean solvent is withdrawn, the improvement comprising introducing said hot lean solvent at a temperature in excess of the normal equilibrium temperature at said point of introduction, and increasing said reflux to utilize excess heat content of said solvent whereby a higher reflux ratio is maintained in said rectifying zone than in said extractive distillation zone.

4. The process according to claim 3 wherein only a portion of the heat of said lean solvent is utilized to permit increase of reflux ratio.

5. In a method of extractively distilling a distillation feed comprising toluene and non-toluene hydrocarbons in the presence of a higher boiling liquid stable solvent in an extractive distillation system comprising a rectifying zone and an extractive distillation zone, said toluene being relatively soluble in said solvent and said non-toluene hydrocarbons being relatively insoluble therein, said solvent being introduced to said system at a point intermediate to said rectifying zone and said extractive distillation zone, wherein in said latter zone vapors of said feed contact descending liquid solvent and reflux, the latter originating at the top of said rectifying zone, to produce a fat solvent rich in toluene and residual vapors rich in non-toluene hydrocarbons, which latter pass to said rectifying zone while said fat solvent is withdrawn from the lower portion of said extractive distillation zone, the improvement comprising introducing said solvent at a temperature in excess of the normal equilibrium temperature at said point of introduction and increasing said reflux to utilize excess heat content of said solvent whereby a higher reflux ratio is maintained in said rectifying zone than in said extractive distillation zone.

GINO PIEROTTI.
CLARENCE L. DUNN.